US009032599B2

(12) United States Patent
Spanos et al.

(10) Patent No.: US 9,032,599 B2

(45) Date of Patent: May 19, 2015

(54) COMPONENT REMOVAL APPARATUS FOR USE IN TURBINE ENGINES AND METHODS OF REMOVING COMPONENTS FROM TURBINE ENGINES

(75) Inventors: Charles Vaughan Spanos, Mauldin, SC (US); Randall Stephen Corn, Travelers Rest, SC (US); John William Herbold, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 751 days.

(21) Appl. No.: 13/367,057

(22) Filed: Feb. 6, 2012

(65) Prior Publication Data

US 2013/0202417 A1 Aug. 8, 2013

(51) Int. Cl.

*B23P 19/04* (2006.01)
*F01D 25/28* (2006.01)
*B25B 27/02* (2006.01)
*B25B 27/14* (2006.01)
*F04D 29/64* (2006.01)

(52) U.S. Cl.

CPC ........... *F01D 25/285* (2013.01); *Y10T 29/5383* (2015.01); *Y10T 29/53848* (2015.01); *Y10T 29/53896* (2015.01); *Y10T 29/53796* (2015.01); *Y10T 29/49822* (2015.01); *B25B 27/026* (2013.01); *B25B 27/14* (2013.01); *F04D 29/644* (2013.01); *F05D 2230/70* (2013.01); *F05D 2230/68* (2013.01)

(58) Field of Classification Search

USPC ............. 29/252, 281.1, 253, 271, 280, 281.5, 29/282; 269/37

See application file for complete search history.

(56) References Cited

U.S. PATENT DOCUMENTS 4,031,982 A * 6/1977 Lindfors ...................... 29/281.5
4,796,346 A * 1/1989 Kawasaki et al. ............... 29/700
6,050,548 A * 4/2000 Leger ............................ 254/326
6,079,943 A 6/2000 Sexton et al.
8,191,862 B2 * 6/2012 Arabian ....................... 254/10.5
2011/0247193 A1 10/2011 Herbold
2011/0252804 A1 10/2011 Yelmule et al.

* cited by examiner

*Primary Examiner* — Lee D Wilson
*Assistant Examiner* — Nirvana Deonauth
(74) *Attorney, Agent, or Firm* — Armstrong Teasdale LLP

(57) ABSTRACT

A component removal apparatus for use with a turbine engine is provided. The apparatus includes a main body and at least one alignment member that extends from the main body, wherein the alignment member is configured to position the apparatus relative to at least a portion of a component of the turbine engine. At least one leg member extends outwardly from at least one end portion of the main body. At least one lifting member is coupled to the leg member and is configured to apply a force to the leg member and/or the main body to facilitate the removal of the component from the turbine engine.

17 Claims, 3 Drawing Sheets

COMPONENT REMOVAL APPARATUS FOR USE IN TURBINE ENGINES AND METHODS OF REMOVING COMPONENTS FROM TURBINE ENGINES

BACKGROUND OF THE INVENTION

The field of the invention relates generally to turbine engines and, more particularly, to a component removal apparatus that may be used with turbine engines.

At least some known turbine engines, such as gas turbine engines, include a compressor, at least one combustor, and a turbine. The compressor generally includes a compressor discharge casing (CDC) that encases the combustor. At least some known gas turbine engines channel air through the CDC. The compressor also includes a stationary inner barrel, wherein the aft end of the inner barrel is coupled to the CDC. The inner barrel is formed of two semi-cylindrical mating halves or portions that are coupled to each other generally along a horizontal midline forming an annulus. More specifically, the upper and lower mating portions are coupled to each other at a horizontal joint. The inner barrel, in part, segregates a high-pressure region external to the inner barrel from a lower pressure region within the inner barrel and about a rotor. The inner barrel portion at the horizontal joint have metal-to-metal contact surfaces that are machined to high tolerances in efforts to eliminate leakage after assembly and during use.

During maintenance of the gas turbine engine, the inner barrel upper mating portion is separated from the inner barrel lower mating portion, and the upper mating portion is removed from the gas turbine engine. However, it can be difficult to separate the upper and lower mating portions from each other. For example, the upper and lower mating portions may deform due to the relatively high combustion temperatures during normal operation of the turbine engine. The deformation may inhibit the separation between the upper and lower mating portions. Moreover, while sledge hammers and wedges may be used at the horizontal joint in order to achieve separation, the inner barrel joint has been known to be damaged via the process. Hydraulic jacks have been considered to be used between the rotor and the inner barrel to apply an upward force such that the upper mating portion can be separated from the lower mating portion, and the upper mating portion can be removed from the gas turbine engine. However, such a process has not been approved by industry standards.

BRIEF DESCRIPTION OF THE INVENTION

In one embodiment, a component removal apparatus for use with a turbine engine is provided. The apparatus includes a main body and at least one alignment member that extends from the main body, wherein the alignment member is configured to position the apparatus relative to at least a portion of a component of the turbine engine. At least one leg member extends outwardly from at least one end portion of the main body. At least one lifting member is coupled to the leg member and is configured to apply a force to the leg member and/or the main body to facilitate the removal of the component from the turbine engine.

In another embodiment, a turbine engine is provided. The turbine engine includes a component and a component removal apparatus that is coupled to the component. The apparatus includes a main body and at least one alignment member that extends from the main body, wherein the alignment member is configured to position the apparatus relative to at least a portion of the component. At least one leg member extends outwardly from at least one end portion of the main body. At least one lifting member is coupled to the leg member and is configured to apply a force to the leg member and/or the main body to facilitate the removal of the component from the turbine engine.

In yet another embodiment, a method of removing a component from a turbine engine is provided. A component removal apparatus is positioned relative to at least a portion of the component via at least one alignment member that extends from a main body of the component removal apparatus. At least one leg member extends outwardly from at least one end portion of the main body. At least one lifting member is coupled to the leg member. A force is applied to the leg member and/or the main body, via the lifting member, to facilitate the removal of the component from the turbine engine.

DETAILED DESCRIPTION OF THE INVENTION

The exemplary apparatus, systems, and methods described herein overcome at least some known disadvantages of at least some known devices that are used to remove a component, such as an upper mating portion of an inner barrel, from a turbine engine. The embodiments described herein provide a component removal apparatus for use with a turbine engine. The apparatus includes a main body and at least one alignment member that extends from the main body, wherein the alignment member is configured to position the apparatus relative to at least a portion of a component of the turbine engine, such as an upper matting motion of an inner barrel. At least one leg member extends outwardly from at least one end portion of the main body. At least one lifting member is coupled to the leg member and is configured to apply a force to the leg member and/or the main body to facilitate the removal of the upper mating portion from the turbine engine. By using an apparatus that is coupled to the upper mating portion, the use of a wedge at the inner barrel joint is not necessary and damage to the inner barrel joint may be inhibited. Accordingly, the component removal apparatus facilitates separation of the inner barrel upper mating portion from the inner barrel lower mating portion and facilitates the removal of the upper mating portion from the gas turbine engine, while substantially inhibiting damage to the inner barrel.

Figure 1:
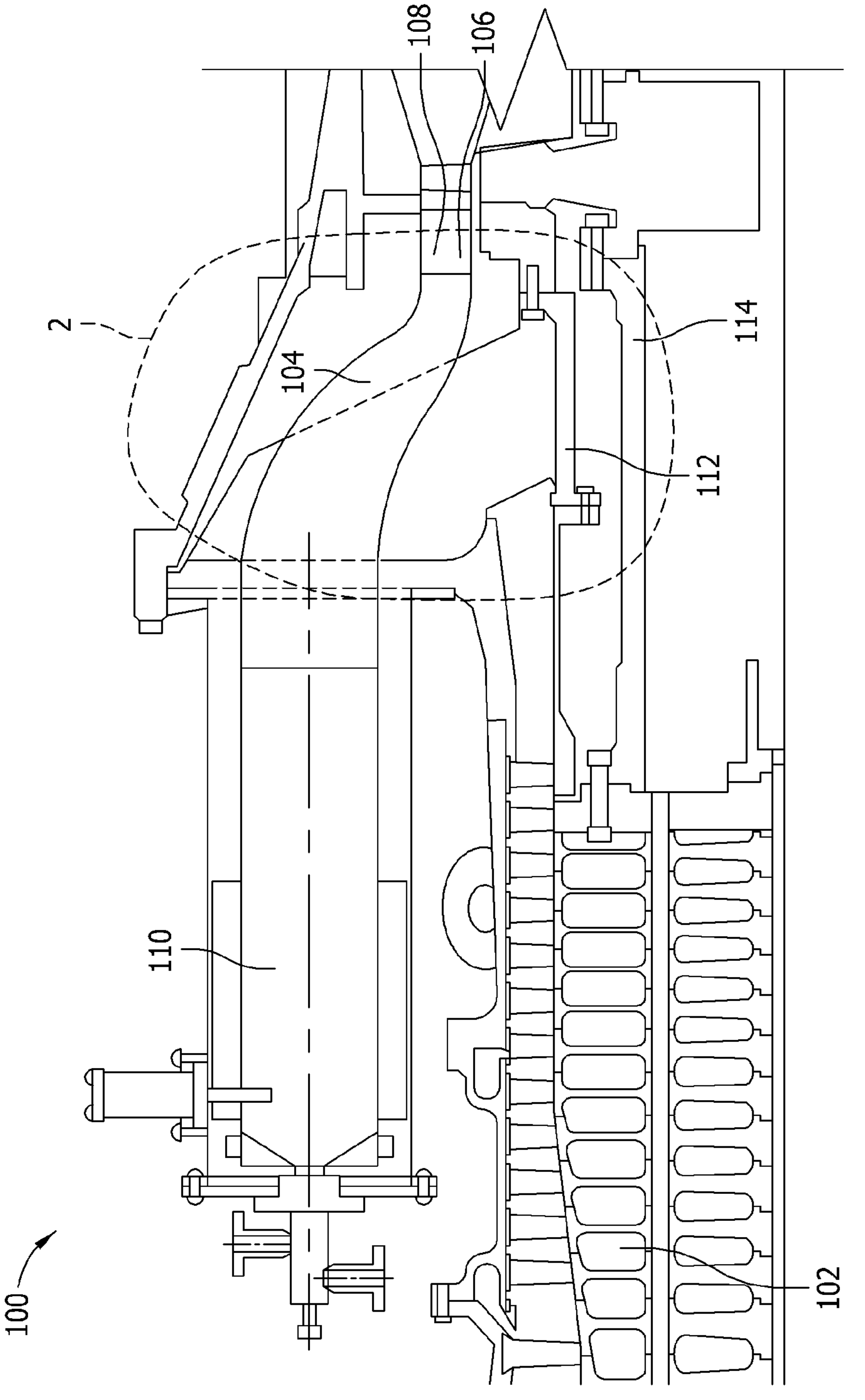
FIG. 1 is a schematic of an exemplary turbine engine.

FIG. 1 illustrates an exemplary turbine engine 100. More specifically, turbine engine 100 is a gas turbine engine. While the exemplary embodiment includes a gas turbine engine, the present disclosure is not limited to any one particular engine, and one of ordinary skill in the art will appreciate that the current disclosure may be used in connection with other types of turbine engines and/or other types of power systems. Turbine engine 100 includes a compressor or compressor section 102 and a turbine section 104 that includes first-stage nozzles 106 and buckets 108. Turbine engine 100 also includes a plurality of combustors 110.

Compressor 102 includes an inner compressor discharge case or inner barrel 112 and a compressor discharge casing (CDC) 114. CDC 114 is configured to couple inner barrel 112 to a first-stage nozzle support ring 116. It should be noted that, as used herein, the term "couple" is not limited to a direct mechanical, electrical, and/or communication connection between components, but may also include an indirect mechanical, electrical, and/or communication connection between multiple components.

Inner barrel 112 and CDC 114 are stationary. A component removal apparatus (not shown in FIG. 1) may be used during maintenance of turbine engine 100. For example, the component removal apparatus may be positioned on at least a portion of the inner barrel 112 and/or at least a portion of CDC 114 during maintenance of the turbine engine 100.

During operation, air is channeled towards compressor section 102 wherein the air is compressed to a higher pressure and temperature prior to being discharged towards combustors 110. The compressed air is mixed with fuel and ignited to generate combustion gases that are channeled towards turbine section 104. More specifically, in combustors 110, fuel, for example, natural gas and/or fuel oil, is injected into the air flow, and the fuel-air mixture is ignited to generate high temperature combustion gases that are channeled towards turbine section 104. Turbine section 104 converts the thermal energy from the gas stream to mechanical rotational energy, as the combustion gases impart rotational energy to turbine section 104 and to a rotor assembly (not shown) such that power may be generated.

When turbine engine 100 is undergoing general maintenance, the component removal apparatus may be positioned on, for example, at least a portion of inner barrel 112 and/or CDC 114. As explained in more detail below, the component removal apparatus is configured to remove a portion of inner barrel 112 from turbine engine 100. As such, an interior portion (not shown) of inner barrel 112 may be inspected.

Figure 2:
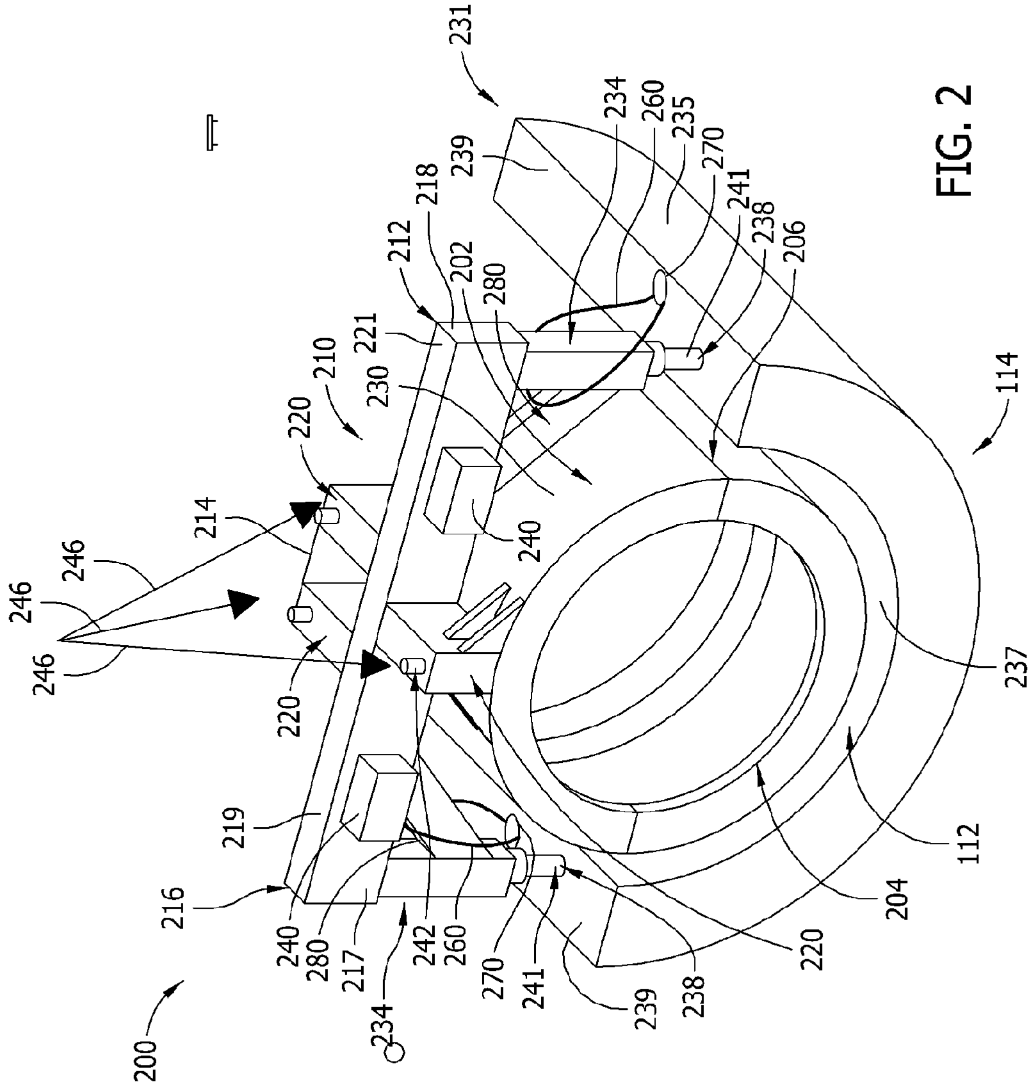
FIG. 2 is a perspective view of an exemplary component removal apparatus that may be used with the turbine engine shown in FIG. 1 and taken from area 2.

FIG. 2 is a perspective view of an exemplary component removal apparatus 200 that may be used with turbine engine 100 and taken from area 2 (shown in FIG. 1). In the exemplary embodiment, component removal apparatus 200 is positioned on inner barrel 112. More specifically, in the exemplary embodiment, inner barrel 112 is formed of a pair of semi-cylindrical portions, e.g., upper mating portion 202 and lower mating portion 204, and component removal apparatus 200 is positioned on at least a portion of upper mating portion 202. The upper mating portion 202 and lower mating portion 204 are coupled to each other by bolts (not shown) along a horizontal midline or joint 206 of turbine engine 100. The upper and lower mating portions, 202 and 204, respectively, are conventionally bolted to one another adjacent opposite ends with their margins or surfaces (not shown) abutting one another. The margins are generally machined to a high tolerance to preclude leakage at horizontal joint 206.

In the exemplary embodiment, component removal apparatus 200 includes a main body 210 that has a first end portion 212, a middle portion 214, and a second end portion 216. Main body 210 also has a first surface 217, a second surface 218, an upper surface 219, and a lower surface 221. In the exemplary embodiment, main body 210 has a substantially rectangular shape. Alternatively, main body 210 may have any other shape that enables apparatus 200 and/or turbine engine 100 to function as described herein.

Component removal apparatus 200 includes at least one alignment member 220 that is coupled to main body middle portion 214. More specifically, in the exemplary embodiment, one alignment member 220 is coupled to main body middle portion 214 such that alignment member 220 extends substantially perpendicularly from main body first surface 217. Apparatus 200 also includes two alignment members 220 that are coupled to main body middle portion 214 such that each alignment member 220 extends substantially perpendicularly from main body second surface 218. Alignment members 220 may be removably coupled with main body 210, or alignment members 220 and main body 210 may be integrally formed together as a single piece. In the exemplary embodiment, each alignment member 220 is positioned on at least a portion of upper mating portion 202 to enable apparatus 200 to be positioned on at least a portion of upper mating portion 202. More specifically, each alignment member 220 is positioned on an upper surface 230 of upper mating portion 202 to enables a portion of main body middle portion 214 to be positioned on upper surface 230 of upper mating portion 202.

In the exemplary embodiment, apparatus 200 includes at least one leg member 234 that extends outwardly from main body first end portion 212 and/or main body second end portion 216. More specifically, in the exemplary embodiment, one leg member 234 extends outwardly from first end portion 212 and one leg member 234 extends outwardly from second end portion 216. In the exemplary embodiment, each leg member 234 is coupled to first end portion 212 and second end portion 216 such that each leg member 234 extends substantially perpendicularly from main body lower surface 221. Leg members 234 may be removably coupled with main body 210, or leg members 234 and main body 210 may be integrally formed together as a single piece.

In the exemplary embodiment, a load application apparatus or lifting member 238 is coupled to each leg member 234 such that each lifting member 238 is positioned between leg member 234 and a portion of CDC 114. In the exemplary embodiment, CDC 114 includes a lower mating portion 231 having an exterior surface 235, an interior surface 237, and a horizontal joint 239. Moreover, inner barrel 112 is positioned within lower mating portion 231. Each lifting member 238 extends outwardly from leg member 234 to horizontal joint 239. In the exemplary embodiment, each lifting member 238 is a hydraulic jack that includes a cylinder 241. Each lifting member 238 is configured to apply a force to leg member 238 and/or to main body 210 to facilitate the separation of upper mating portion 202 from lower mating portion 204, and the subsequent removal of upper mating portion 202 from turbine engine 100. While lifting member 238 is a hydraulic jack, the present disclosure is not limited to any one particular load application apparatus. For example, lifting member 238 may be a levered arm or screw jack.

Component removal apparatus 200 may also include at least one housing 240 coupled to main body middle portion 214. More specifically, in the exemplary embodiment, apparatus 200 includes two housings 240 that are each coupled to main body first surface 217. Each housing 240 is configured to receive and enclose one lifting member 238. For example, each housing 240 may be a rectangular or square-shaped box defining a cavity (not shown) therein. Lifting member 238 may be positioned within the cavity.

A fastener 242 may be coupled to each alignment member 220, wherein fastener 242 is configured to couple apparatus 200 to a lifting machine (not shown), such as a crane, via at least one cable 246. A portion of the lifting machine is positioned a predefined distance (not shown) above apparatus 200. More specifically, in the exemplary embodiment, each fastener 242 is a bolt such that cable 246 may be coupled to it. Alternatively, fastener 242 may be any other type of device that is configured to couple apparatus 200 to the lifting machine. In the exemplary embodiment, cable 246 extends from each fastener 242 to couple to the lifting machine. Moreover, a cable 260 is coupled to at least one leg member 234 and is configured to couple component removal apparatus 200 to a portion of turbine engine 100. More specifically, cable 260 substantially circumscribes each leg member 234 and is coupled to a bolt 270 that is positioned on horizontal joint 239 of compressor discharge casing 114. Accordingly, cable 260 enables apparatus 200 to be coupled to compressor discharge casing 114.

Alternatively, cable 260 may be coupled to another portion of apparatus 200. For example, each leg member 234 may be coupled to a side leg member 280 that extends outwardly from main body middle portion 214. More specifically, apparatus 200 includes two side leg members 280 that each extend outwardly at an angle (not shown) from lower surface 221 to one leg member 234 such that each side leg member 280 supports each leg member 234. Cable 260 may substantially circumscribe each side leg member 280 and couple to each bolt 270.

During operation, component removal apparatus 200 may be positioned on, for example, at least a portion of inner barrel 112 and/or CDC 114 to facilitate the removal of a portion of inner barrel 112 from turbine engine 100. Lifting members 238 are first hydraulically actuated. More specifically, in the exemplary embodiment, each lifting member 238 uses a fluid, which is incompressible, that is forced into cylinder 241 by a pump (not shown) or a pump plunger (not shown). The fluid may be self lubricating and stable, such as oil. As fluid pressure builds in cylinder 241, each lifting member 238 is hydraulically actuated to apply an upward force or load onto each leg member 234. The force or load imposed on each leg member 234 further imposes an upward force on main body 210 that results in the separation of inner barrel upper mating portion 202 from inner barrel lower mating portion 204. Since component removal apparatus 200 is coupled to horizontal joint 239 of CDC 114 via cables 260, the force may be applied and apparatus 200 remains securely positioned on upper mating portion 202 even when upper mating portion 202 is separated from lower mating portion 204.

When upper mating portion 202 is separated from lower mating portion 204, upper mating portion 202 may then be removed from turbine engine 100. More specifically, cables 260 are removed from leg member 234 such that component removal apparatus 200 is no longer coupled to horizontal joint 239 of CDC 114. The lifting machine or crane then may lift cables 246 upwardly away from lower mating portion 204. As cables 246 are lifted, component apparatus 200 and upper mating portion 202 are lifted upwardly away from lower mating portion 204 and turbine engine 100. Accordingly, upper mating portion 202 is removed from turbine engine 100.

Since apparatus 200 is coupled to upper mating portion 202 and CDC 114, the use of a wedge (not shown) at inner barrel joint 206 is not necessary and damage to inner barrel joint 206 may be inhibited. Accordingly, component removal apparatus 200 facilitates separation of inner barrel upper mating portion 202 from inner barrel lower mating portion 204 and facilitates the removal of upper mating portion 202 from gas turbine engine 100, while substantially inhibiting damage to inner barrel 112. While the exemplary embodiment includes the removal of upper mating portion 202 by apparatus, the present invention is not limited to the removal of upper mating portion 202, and one of ordinary skill in the art will appreciate that apparatus 200 may be used to remove other components.

Figure 3:
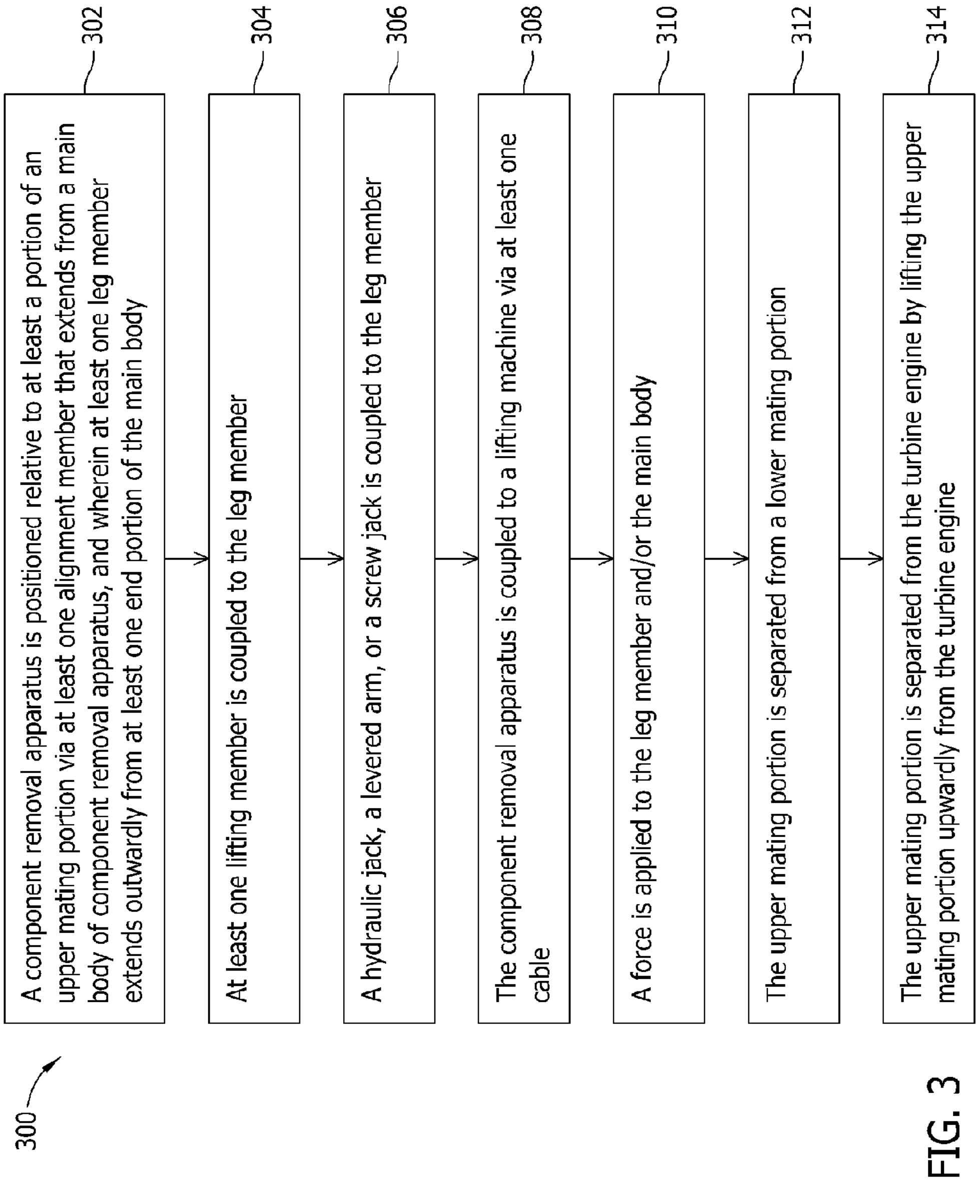
FIG. 3 is a flow chart of an exemplary method of removing a component from a turbine engine using the component removal apparatus shown in FIG. 2.

FIG. 3 is a flow chart of an exemplary method 300 of removing a component, such as an upper mating portion 202 (shown in FIG. 2) of an inner barrel 112 (shown in FIGS. 1 and 2), from a turbine engine 100 (shown in FIG. 1) using a component removal apparatus, such as component removal apparatus 200 (shown in FIG. 2.). In the exemplary embodiment, component removal apparatus 200 is positioned 302 relative to at least a portion of upper mating portion 202 via at least one alignment member 220 (shown in FIG. 2) that extends from a main body 210 (shown in FIG. 2) of component removal apparatus 200, and wherein at least one leg member 234 (shown in FIG. 2) extends outwardly from at least one end portion, such as first end portion 212 (shown in FIG. 2), of main body 210. At least one lifting member 238 (shown in FIG. 2) is coupled 304 to leg member 234. More specifically, in the exemplary embodiment, a hydraulic jack, a levered arm, or a screw jack is coupled 306 to leg member 234.

Component removal apparatus 200 is coupled 308 to a lifting machine (not shown) via at least one cable 246 (shown in FIG. 2), wherein cable 246 is coupled to a fastener 242 (shown in FIG. 2) on alignment member 220. A force is then applied 310 to leg member 234 and/or main body 210, via lifting member 238, to facilitate the removal of upper mating portion 202 from turbine engine 100. More specifically, when the force is applied 310, upper mating portion 202 is separated 312 from a lower mating portion 204 (shown in FIG. 2). Upper mating portion 202 is then separated 314 from turbine engine 100 by lifting upper mating portion 202 upwardly from turbine engine 100 via the lifting machine.

As compared to at least some known devices that are used to remove a component, such as an upper mating portion of an inner barrel, from a turbine engine, the embodiments described herein provide a component removal apparatus that can remove such a component while also inhibiting damage to the component and/or other components within the turbine engine. More specifically, the embodiments described herein provide a component removal apparatus for use with a turbine engine. The apparatus includes a main body and at least one alignment member that extends from the main body, wherein the alignment member is configured to position the apparatus relative to at least a portion of a component of the turbine engine, such as an upper matting motion of an inner barrel. At least one leg member extends outwardly from at least one end portion of the main body. At least one lifting member is coupled to the leg member and is configured to apply a force to the leg member and/or the main body to facilitate the removal of the upper mating portion from the turbine engine. By using an apparatus that is coupled to the upper mating portion, the use of a wedge at the inner barrel joint is not necessary and damage to the inner barrel joint may be inhibited. Accordingly, the component removal apparatus facilitates separation of the inner barrel upper mating portion from the inner barrel lower mating portion and facilitates the removal of the upper mating portion from the gas turbine engine, while substantially inhibiting damage to the inner barrel.

Exemplary embodiments of the apparatus, systems, and methods are described above in detail. The apparatus, systems, and methods are not limited to the specific embodiments described herein, but rather, components of the apparatus and systems and/or steps of the methods may be utilized independently and separately from other components and/or steps described herein. For example, the apparatus and systems may also be used in combination with other systems and methods, and is not limited to practice with only the apparatus and systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component removal apparatus for use with a turbine engine, said component removal apparatus comprising:
- a main body;
- at least one alignment member extending from said main body and configured to position said component removal apparatus relative to at least a portion of a first component of the turbine engine;
- at least one leg member extending outwardly from at least one end portion of said main body;
- at least one lifting member coupled to said at least one leg member and configured to apply a force to at least one of said at least one leg member and said main body to facilitate the removal of the component from the turbine engine; and
- at least one cable substantially circumscribing said at least one leg member, said at least one cable is configured to couple said component removal apparatus to a second component of the turbine engine.

2. The component removal apparatus in accordance with claim 1, wherein said at least one lifting member comprises one of a hydraulic jack, a levered arm, and a screw jack.

3. The component removal apparatus in accordance with claim 1, wherein said main body comprises a first end portion and a second end portion, said at least one leg member comprises a first leg member extending from said first end portion and a second leg member extending from said second end portion.

4. The component removal apparatus in accordance with claim 3, wherein said at least one lifting member comprises a first lifting member coupled to said first leg member and a second lifting member coupled to said second leg member.

5. The component removal apparatus in accordance with claim 1, further comprising at least one housing coupled to said main body, wherein said at least one housing is configured to receive and enclose said at least one lifting member.

6. The component removal apparatus in accordance with claim 1, further comprising a fastener coupled to said at least one alignment member, wherein said fastener is configured to couple said component removal apparatus to a lifting machine via at least one cable.

7. A turbine engine comprising:
- a component; and
- a first component removal apparatus coupled to said component, said component removal apparatus comprising:
  - a main body;
  - at least one alignment member extending from said main body and configured to position said component removal apparatus relative to at least a portion of said component;
  - at least one leg member extending outwardly from at least one end portion of said main body;
  - at least one lifting member coupled to said at least one leg member and configured to apply a force to at least one of said at least one leg member and said main body to facilitate the removal of said component from said turbine engine; and
  - at least one cable substantially circumscribing said at least one leg member, wherein said at least one cable is configured to couple said component removal apparatus to a second component of said turbine engine.

8. The turbine engine in accordance with claim 7, wherein said at least one lifting member comprises one of a hydraulic jack, a levered arm, and a screw jack.

9. The turbine engine in accordance with claim 7, wherein said main body comprises a first end portion and a second end portion, said at least one leg member comprises a first leg member extending from said first end portion and a second leg member extending from said second end portion.

10. The turbine engine in accordance with claim 9, wherein said at least one lifting member comprises a first lifting member coupled to said first leg member and a second lifting member coupled to said second leg member.

11. The turbine engine in accordance with claim 7, wherein said component removal apparatus further comprises at least one housing coupled to said main body, wherein said at least one housing is configured to receive and enclose said at least one lifting member.

12. The turbine engine in accordance with claim 7, wherein said component removal apparatus further comprises a fastener coupled to said at least one alignment member, said fastener is configured to couple said component removal apparatus to a lifting machine via at least one cable.

13. The turbine engine in accordance with claim 7, wherein said component comprises an upper mating portion of an inner barrel and said second component comprises a compressor discharge casing.

14. A method of removing a component from a turbine engine, said method comprising:
- positioning a component removal apparatus relative to at least a portion of the component via at least one alignment member that extends from a main body of the component removal apparatus, wherein at least one leg member extends outwardly from at least one end portion of the main body;
- coupling at least one lifting member to the at least one leg member;
- applying a force to at least one of the at least one leg member and the main body, via the at least one lifting member, to facilitate the removal of the component from the turbine engine; and
- coupling the component removal apparatus to a lifting machine via at least one cable, wherein the at least one cable is coupled to at least one fastener on the at least one alignment member.

15. The method in accordance with claim 14, wherein coupling at least one lifting member comprises coupling one of a hydraulic jack, a levered arm, and a screw jack to the at least one leg member.

16. The method in accordance with claim 14, wherein positioning the component removal apparatus further comprises positioning the component removal apparatus that includes the main body having a first end portion and a second end portion, wherein a first leg member extends outwardly from the first end portion and a second leg member extends outwardly from the second end portion.

17. A method in accordance with claim 14, further comprising separating the component from the turbine engine by lifting the component upwardly from the turbine engine via the lifting machine.

* * * * *